US012624677B2

(12) United States Patent
Juhl et al.

(10) Patent No.: US 12,624,677 B2
(45) Date of Patent: May 12, 2026

(54) REINFORCEMENT OF A WIND TURBINE BLADE

(71) Applicant: LM Wind Power A/S, Kolding (DK)

(72) Inventors: Lars Juhl, Kolding (DK); Jesper Hasselbelch Garm, Kolding (DK); Danial Ashouri Vajari, Kolding (DK); Steen Mortensen, Kolding (DK)

(73) Assignee: LM Wind Power A/S, Kolding (DK)

( * ) Notice: Subject to any disclaimer, the term of this patent is extended or adjusted under 35 U.S.C. 154(b) by 70 days.

(21) Appl. No.: 18/273,638

(22) PCT Filed: Jan. 25, 2022

(86) PCT No.: PCT/EP2022/051640
§ 371 (c)(1),
(2) Date: Jul. 21, 2023

(87) PCT Pub. No.: WO2022/157391
PCT Pub. Date: Jul. 28, 2022

(65) Prior Publication Data
US 2024/0102443 A1      Mar. 28, 2024

(30) Foreign Application Priority Data
Jan. 25, 2021    (GB) ..................................... 2100935

(51) Int. Cl.
*F03D 1/06* (2006.01)
*B29C 65/54* (2006.01)
(Continued)

(52) U.S. Cl.
CPC ............ *F03D 1/066* (2023.08); *B29C 65/542* (2013.01); *B29C 65/8292* (2013.01);
(Continued)

(58) Field of Classification Search
CPC ........... F03D 17/00–0285; F03D 80/50; F03D 80/502; F05B 2230/80; B29C 65/542; B29C 65/8292; B29L 2031/085
See application file for complete search history.

(56) References Cited

U.S. PATENT DOCUMENTS

| | | | |
|---|---|---|---|
| 8,186,960 B2 * | 5/2012 | Dawson | .................... B23P 6/00 |
| | | | 416/62 |
| 9,194,843 B2 * | 11/2015 | Newman | ................ G01N 29/22 |

(Continued)

FOREIGN PATENT DOCUMENTS

| | | |
|---|---|---|
| EP | 2532881 B1 | 12/2012 |
| WO | 2011132839 A1 | 10/2011 |
| WO | 2020193753 A | 10/2020 |

OTHER PUBLICATIONS

An IP.com Prior Art Database Technical Disclosure; Method of high-pressure adhesive injection at interfaces within a wind turbine blade; Authors et. al.: Disclosed Without Attribution; IP.com No. IPCOM000264395D (Year: 2020).*
Kuhn; "Method of high-pressure adhesive injection at interfaces within a wind turbine blade"; ip.com, IP.COM Inc., West Henrietta, NY, US. Dec. 10, 2020.

*Primary Examiner* — Sang K Kim
(74) *Attorney, Agent, or Firm* — Dority & Manning, P.A.

(57) ABSTRACT

The present invention provides a to method for reinforcing a wind turbine blade, such as a root end. The root end comprises a first and a second bushing for attaching the wind turbine blade to a wind turbine hub, the bushings being located between an inner sidewall of the root end and an outer sidewall of the root end, the bushings being separated by retaining material, the method comprising forming a first injection channel in the retaining material; forming a first pressure release channel in the first retaining material, wherein the first pressure release channel is formed to be in fluid communication with the first injection channel in a (Continued)

region between the inner sidewall and the outer sidewall; and injecting adhesive material into the first injection channel at least until adhesive material enters the formed first pressure release channel. The invention also provides a wind turbine blade having a root end that has been reinforced using such a method. Further aspects are provided.

33 Claims, 14 Drawing Sheets

(51) Int. Cl.
  *B29C 65/82* (2006.01)
  *B29L 31/08* (2006.01)
(52) U.S. Cl.
  CPC ...... *F03D 1/0681* (2023.08); *B29L 2031/085* (2013.01); *F05B 2280/6003* (2013.01)

(56) References Cited

U.S. PATENT DOCUMENTS

| | | | |
|---|---|---|---|
| 10,626,847 B2 * | 4/2020 | Albert | B29D 99/0028 |
| 11,480,156 B2 * | 10/2022 | Kuroiwa | G01N 29/0645 |
| 2005/0106029 A1 | 5/2005 | Kildegaard | |
| 2011/0209347 A1 * | 9/2011 | Deak | F03D 1/06 |
| | | | 29/889.1 |
| 2015/0071701 A1 * | 3/2015 | Raina | B29C 66/53 |
| | | | 403/270 |
| 2015/0159633 A1 * | 6/2015 | Jepsen | G01M 3/26 |
| | | | 73/37 |
| 2019/0111637 A1 * | 4/2019 | Hanna | B29C 70/549 |
| 2020/0124031 A1 | 4/2020 | Kuroiwa et al. | |
| 2025/0020108 A1 * | 1/2025 | Graff | B29C 73/26 |

* cited by examiner

SECTION A-A

SECTION A'-A'

SECTION B-B

SECTION B-B

SECTION B-B

SECTION B-B

SECTION C-C

SECTION C-C

SECTION C-C

REINFORCEMENT OF A WIND TURBINE BLADE

This is a National Phase Application filed under 35 U.S.C. 371 as a national stage of PCT/EP2022/051640, filed Jan. 25, 2022, an application claiming the benefit of British Application No. 2100935.2, filed Jan. 25, 2021, the content of each of which is hereby incorporated by reference in its entirety.

TECHNICAL FIELD

The present invention relates to a root end of a wind turbine blade, in particular to a method of reinforcement of such a root end and to a wind turbine blade with a reinforced root end.

BACKGROUND

The root end of a wind turbine blade allows firm and secure attachment of the blade to the hub of a wind turbine. Manufacturing of a root end may for instance include laying up a number of layers of a fibre material inside a mould to form an outer skin. Then, a plurality of fastening elements is positioned relative to the mould and the outer skin fibre layers, resulting in an outer sidewall after resin infusion. Individual fastening elements are connected to a root end plate holding them in place during manufacturing. A plurality of retaining members is afterwards positioned between the individual fastening members. Further layers of the fibre material are laid up over the fastening and retaining members to form an inner skin, resulting in an inner sidewall after resin infusion. The structure is then enclosed by a bag material, and resin is introduced using vacuum infusion. The resin is finally cured, whereby a first wind turbine blade shell part is formed. A second wind turbine blade shell part is manufactured in a similar manner, after which the two wind turbine blade parts are attached to one another, typically by gluing.

The fastening elements in a wind turbine blade for attaching the blade to the wind turbine hub typically comprise a bushing assembly in the root end of the wind turbine blade.

Both during blade manufacturing and during operation, defects may form. For instance, a bushing may dislodge from the retaining material, whereby a gap is formed. Such defects in the root end may potentially lead to critical failure of the blade.

Other parts of a wind turbine blade may also need reinforcement, including while the blade is attached to a wind turbine hub, which involves a high risk to personnel.

SUMMARY OF THE INVENTION

The inventors have realised that there may arise a need for reinforcing root ends of wind turbine blades by eliminating gaps near root end bushings in the root, formed for instance while the blades are attached to a wind turbine hub or existing even before a blade has ever been attached to a wind turbine hub.

In a first aspect, the invention provides a method for reinforcing a root end of a wind turbine blade, the root end comprising a plurality of bushings for attaching the wind turbine blade to a wind turbine hub, each bushing being located between an inner sidewall of the root end and an outer sidewall of the root end, the plurality of bushings being mutually separated by retaining material, a first bushing and a second bushing of the plurality of bushings being separated by first retaining material, the method comprising:

(i) forming a first injection channel in the first retaining material, (ii) forming a first pressure release channel in the first retaining material, wherein the first pressure release channel is formed to be in fluid communication with the first injection channel in a region between the inner sidewall and the outer sidewall, and (iii) injecting adhesive material into the first injection channel at least until adhesive material enters the formed first pressure release channel.

The injection channel is formed such that adhesive can be communicated to a region between the inner sidewall and the outer sidewall of the root end. The pressure release channel is in fluid communication with the injection channel to allow the adhesive to flow as desired. The adhesive will flow through a path of least resistance, and thus the channels are provided such that the adhesive flows to the desired location.

The first injection channel and the first pressure release channel may be formed at a same longitudinal position along a longitudinal axis of the first bushing, or they may be formed at different longitudinal positions along the longitudinal axis of the first bushing. In embodiments where further injection channel(s) and/or pressure release channel(s) are formed, the respective longitudinal positions may coincide or not. Some channels may have been formed at the same longitudinal position, others at different longitudinal positions.

In some embodiments, a width of the first injection channel is in the range 3-8 mm, such as in the range 5-7 mm, such as 6 mm.

In some embodiments, a width of the first pressure release channel is in the range 2-6 mm, such as in the range 3-5 mm, such as 4 mm.

In some embodiments, at least a part of the adhesive material is injected with a pressure of at least 50 bar, such as at least 100 bar, such as at least 200 bar, such as at least 400 bar. In some embodiments, a part of the adhesive material is injected with a pressure of at least 200 bar, and a maximum pressure with which the adhesive material has been injected is at most 600 bar.

In some embodiments, the first injection channel and/or the first pressure release channel is formed through a first sidewall of the root end, wherein the first sidewall is the inner sidewall or the outer sidewall of the root end. In some embodiments, the first sidewall is the inner sidewall, that is, the first injection channel and first release channel are formed from an inside (inner surface) of the root end. In some embodiments, the first sidewall is the outer sidewall, that is, the first injection channel and first release channel are formed from an outside (outer surface) of the root end. In some embodiments, the first injection channel and first pressure release channel are formed from opposing surfaces. However, it is advantageous to form the channels from the same side (surface), as it increases the precision with which adhesive can be provided.

In some embodiments, a direction of the first injection channel or a direction of the first pressure release channel is substantially perpendicular to the inner sidewall and/or the outer sidewall at the location of the respective channel (i.e., forms an angle of 90 degrees with respect to the inner sidewall and/or the outer sidewall at the location of the respective channel). In some embodiments, the direction of the first injection channel and/or the direction of the first pressure release channel forms an angle in the range 60-120 degrees with respect to the inner sidewall or the outer sidewall at the location of the respective channel. In some embodiments, the direction of the first injection channel or the direction of the first pressure release channel forms an angle in the range 30-60 degrees with respect to the inner sidewall or the outer sidewall.

In some embodiments, a viscosity of the adhesive material is in the range 20-60 Pa·s at 25° C. according to standard ASTM-D-2196, such as in the range 30-50 Pa·s, such as in the range 35-45 Pa·s.

In some embodiments, the adhesive material has a maximum service temperature of at least 60° C. according to the property specification provided by the manufacturer of the adhesive material.

In some embodiments, the first injection channel and/or the first pressure release channel is formed through a blade mounting interface of the root end, i.e. the surface where the bushings are exposed. Such embodiments can be combined with a channel or channel(s) formed in the inner sidewall or outer sidewall. For instance, the first injection channel can be formed in the blade mounting interface, and the first pressure release channel can be formed through the inner sidewall of the root end.

In some embodiments, the method further comprises inserting an injection packer into the first injection channel before the step of injecting adhesive material into the first injection channel. The injection packer can facilitate injection of adhesive.

In some embodiments, the method further comprises attaching injecting means to a surface of the root end, in fluid communication with the first injection channel. For instance, a fitting or adapter can be mounted to the surface at the first injection channel, making it possible to resiliently connect a source of adhesive, which is typically provided with a relatively high pressure.

In some embodiments, the first retaining material comprises or is made entirely of a pultruded fibre-reinforced composite element.

In some embodiments, the adhesive material is provided at least until adhesive material entirely fills the first pressure release channel. This results in a very strong repair, replacing the material added when the first pressure release channel was formed. Although not made of reinforced composite material, it still provides a lot of strength and prevents dust and water from entering the channel.

In some embodiments, the method further comprises repeating step (i) one or more times to provide corresponding one or more additional injection channels for injecting adhesive material. This allows injection channels to be provided directly to several cavities. A number of injection channels may share the same or several pressure release channels. In some embodiments, a total number of injection channels in the first retaining material exceeds a total number of pressure release channels. This allows for reducing the amount of material removed in order to form the pressure release channels.

In some embodiments, the method further comprises, instead of or in addition to repeating step (ii) one or more times, providing corresponding one or more additional pressure release channels, the one or more additional pressure release channels being formed to be in fluid communication with the first injection channel and/or with an additional injection channel.

In some embodiments, the total number of injection channels is lower than the total number of pressure release channels. This allows a single injection channel to be used, only, for injecting the adhesive. By providing a number of pressure release channels, the adhesive can flow further from the location of the single (i.e. the first) injection channel. However, the pressure can become relatively high during provision of adhesive, and there is a limit to the number of pressure release channels that can be supported for a single injection channel. Similarly, and dependent on the configuration of the injection channel and the one or more pressure release channels, the same applies with respect to distances the adhesive can flow from the injection channel.

Although some methods in accordance with the invention can be used to inject adhesive near interfaces without cavities, the present invention is ideally suited to eliminate cavities between the sidewalls. Thus, in some embodiments, the first injection channel is formed such that adhesive material can be provided through the first injection channel to a cavity located between the first retaining material and the outer sidewall of the root end. The first injection channel is thus in fluid communication with that cavity.

In some embodiments, the first injection channel is formed such that adhesive material can be provided through the first injection channel specifically to a cavity located between the first retaining material and the inner sidewall of the root end.

In some embodiments, the first injection channel is formed such that adhesive material can be provided through the first injection channel to a cavity located between the first retaining material and the first bushing.

In some embodiments, the first injection channel is in fluid communication with a cavity located between the first sidewall and the first retaining material.

In some embodiments, the first injection channel is in fluid communication with a cavity located between the first retaining material and the first bushing.

It is important that cavities at any of these locations be reinforced, adding both adhesive strength and preventing the elements from further working loose.

In some embodiments, the first injection channel is aimed towards a first point of the first bushing. This allows the injection channel to connect with a cavity adjacent to the bushing.

In some embodiments, the first injection channel is aimed towards a first point of the first bushing, a distance between the inner sidewall and the first point of the first bushing being in the range 0.3-0.7 times a distance (D) between the inner sidewall and the outer sidewall at a location of the first point. Aiming to add adhesive close to the midpoint between the inner sidewall and the outer sidewall results in a more even application of adhesive to that area, and a lower pressure is required in order to add the adhesive.

In some embodiments, the first injection channel is in fluid communication with a cavity located between the second sidewall and the first retaining material.

In some embodiments, the method further comprises:

locating a first cavity between the inner sidewall and the outer sidewall by use of ultrasound equipment, the first injection channel then being formed in fluid communication with the first cavity to allow injection of adhesive material into the first cavity, the first pressure release channel being formed in fluid communication with the first cavity.

In some embodiments, the first injection channel is formed near a first end of the first bushing. In some embodiments, the first injection channel is formed within a distance of 150 mm from the first end of the first bushing.

In some embodiments, the method further comprises performing step (i) at a location near a second end of the first bushing opposite the first end of the bushing, thereby forming a corresponding second injection channel near the second end of the first bushing. In some embodiments, the second injection channel is formed within a distance of 150 mm from the second end of the first bushing.

In some embodiments, the adhesive material is provided along the entire length of the first bushing. This can for instance be after detecting a defect or it can be performed proactively. One or more injection channels and one or more pressure release channels are formed as necessary to provide the adhesive material along the entire length of the first bushing.

In some embodiments, the method is performed while the wind turbine blade is attached to a hub of a wind turbine.

In some embodiments, the method further comprises:

(iv) prior to steps (i) to (iii), monitoring a specific part of the root end between the inner sidewall and the outer sidewall using ultrasound measuring equipment providing a corresponding ultrasound measurement, (v) based on the ultrasound measurement obtained in step (iv), determining that a defect has formed in the specific part of the root end, and (vi) reinforcing the specific part of the root end in response to determining that the defect has formed.

Such monitoring allows personnel to respond to the creation of defects quickly.

In some embodiments, the ultrasound measurement equipment is permanently installed to monitor the specific part of the root end, and wherein the monitoring is performed automatically by the ultrasound measurement equipment.

In some embodiments, the ultrasound measurement is transmitted to a first remote location and the determining that a defect has formed is determined at the first remote location. In some embodiments, the ultrasound monitoring equipment makes the determination. However, personnel evaluation of the measurements may provide a better evaluation of the measurement.

In some embodiments, the ultrasound measurement is transmitted to the first remote location in response to receipt of an ultrasound measurement request signal. That is, a measurement can be requested on-demand. In some embodiments, the measurement is transmitted automatically by the ultrasound measurement equipment (via a wireless or wired transmission system).

A second aspect of the invention provides a root end for a wind turbine blade, reinforced by a method in accordance with an embodiment of the first aspect of the invention. Such a root end is characterised in part by signs of an injection channel and a pressure release channel in the root end. There may also be signs of an injection packer.

A third aspect of the invention provides a wind turbine blade with a root end reinforced by a method in accordance with an embodiment of the first aspect of the invention. Such a blade is characterised in part by signs of an injection channel and a pressure release channel in the root end. There may also be signs of an injection packer.

In a fourth aspect, the invention provides a method for reinforcing a first wind turbine blade region, the method comprising:

(i) forming, from an interior of the wind turbine blade, a first injection channel into the first region, (ii) forming, from an interior of the wind turbine blade, a first pressure release channel into the first region, wherein the first pressure release channel is formed to be in fluid communication with the first injection channel within the first region, and (iii) injecting adhesive material into the first injection channel at least until adhesive material enters the formed first pressure release channel.

The method reinforces a region of a wind turbine blade from an interior of the blade, i.e. from inside the blade. Working from the inside is much safer for personnel, especially when the blade is attached to a wind turbine hub, for instance at a production facility. Safety features inside the blade can be taken advantage of, and strong winds are not an issue.

In some embodiments, the first region is located between an inner surface of the wind turbine blade and an outer surface of the wind turbine blade, and the first injection channel is formed starting from the inner surface, and the first pressure release channel is formed starting from the inner surface.

In some embodiments, the method further comprises inserting an injection packer into the first injection channel before the step of injecting adhesive material into the first injection channel.

In some embodiments, the method further comprises attaching injecting means in fluid communication with the first injection channel.

In some embodiments, the adhesive material is provided at least until adhesive material entirely fills the first pressure release channel.

In some embodiments, the method further comprises repeating step (i) one or more times to provide corresponding one or more additional injection channels for injecting adhesive material.

In some embodiments, the method further comprises repeating step (ii) one or more times to provide corresponding one or more additional pressure release channels, the one or more additional pressure release channels being formed to be in fluid communication with the first injection channel and/or with an additional injection channel.

In some embodiments, the first injection channel is in fluid communication with a cavity located in a shear web of the blade.

In some embodiments, the first injection channel is in fluid communication with a cavity located in a spar cap of the blade.

In a fifth aspect, the invention provides a method for reinforcing a first wind turbine blade region located between an inner surface of the wind turbine blade and an outer surface of the wind turbine blade, the method comprising:

(i) forming a first injection channel into the first region starting from the inner surface, (ii) forming a first pressure release channel into the first region starting from the inner surface, wherein the first pressure release channel is formed to be in fluid communication with the first injection channel in the first region, and (iii) injecting adhesive material into the first injection channel at least until adhesive material enters the formed first pressure release channel.

BRIEF DESCRIPTION OF THE DRAWINGS

The invention is explained in detail below by way of example with reference to the drawings.

DETAILED DESCRIPTION OF SELECTED EMBODIMENTS

Figure 1:
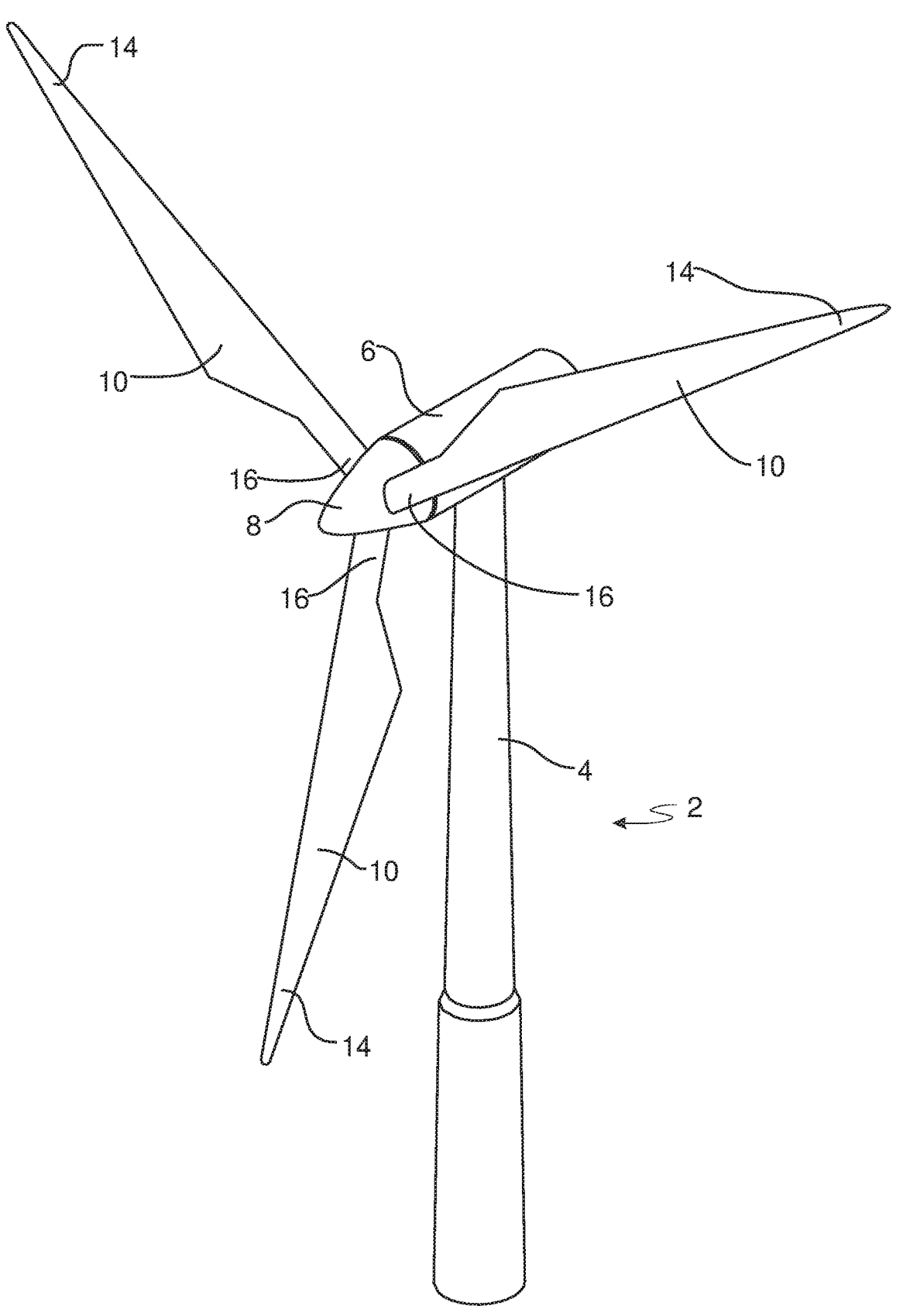
FIG. 1 schematically shows a wind turbine having three wind turbine blades.

FIG. 1 illustrates a conventional modern upwind wind turbine 2 according to the so-called "Danish concept" with a tower 4, a nacelle 6 and a rotor with a substantially horizontal rotor shaft. The rotor includes a hub 8 and three blades 10 extending radially from the hub 8, each having a root end 16 nearest the hub and a blade tip 14 furthest from the hub 8.

Figure 2:
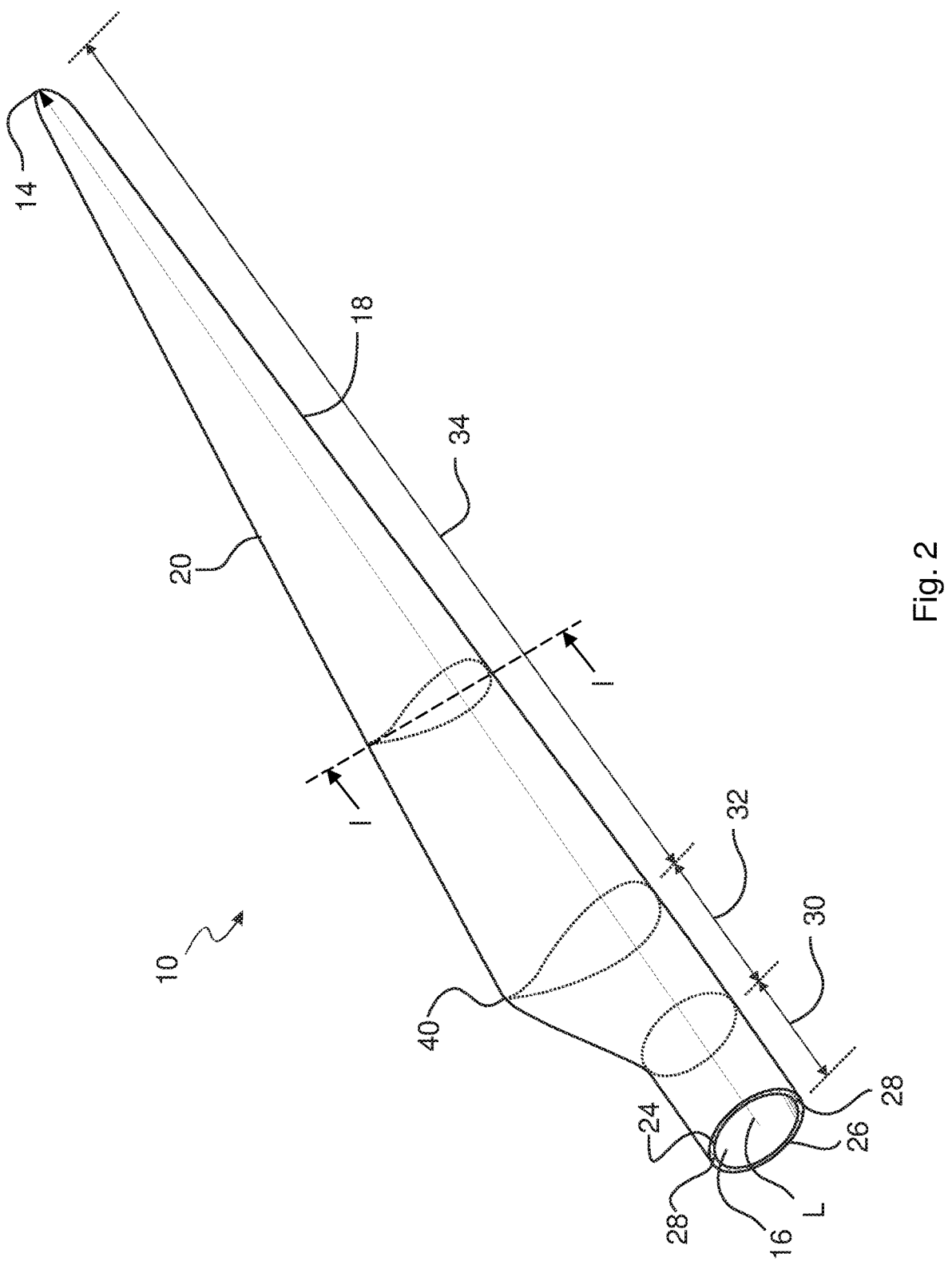
FIG. 2 schematically shows an exemplary wind turbine blade.

FIG. 2 shows a schematic view of an exemplary wind turbine blade 10. The wind turbine blade 10 has the shape of a conventional wind turbine blade with a root end and a tip end and comprises a root region 30 closest to the hub, a profiled or airfoil region 34 furthest away from the hub 8, and a transition region 32 between the root region 30 and the airfoil region 34. The blade 10 comprises a leading edge 18 facing the direction of rotation of the blade 10, when the blade is mounted on the hub, and a trailing edge 20 facing the opposite direction of the leading edge 18. The airfoil region 34, also called the profiled region, has an ideal or almost ideal blade shape with respect to generating lift, whereas the root region 30 due to structural considerations has a substantially circular or elliptical cross-section, which for instance makes it easier and safer to mount the blade 10 to the hub 8. The diameter (or the chord) of the root region 30 may be constant along the entire root area 30. The transition region 32 has a transitional profile gradually changing from the circular or elliptical shape of the root region 30 to the airfoil profile of the airfoil region 34. The chord length of the transition region 32 typically increases with increasing distance r from the hub. The airfoil region 34 has an airfoil profile with a chord extending between the leading edge 18 and the trailing edge 20 of the blade 10. The width of the chord in the airfoil region 34 typically decreases with increasing distance from the hub. A shoulder 40 of the blade 10 is defined as the position where the blade 10 has its largest chord length. The shoulder 40 is typically provided at the boundary between the transition region 32 and the airfoil region 34.

The wind turbine blade 10 comprises a blade shell comprising two blade shell parts, a first blade shell part 24 and a second blade shell part 26, typically made of fibre-reinforced polymer. The first blade shell part 24 is typically a pressure side or upwind blade shell part. The second blade shell part 26 is typically a suction side or downwind blade shell part. The first blade shell part 24 and the second blade shell part 26 are attached to one another with adhesive, such as glue, along bond lines or glue joints 28 extending along the trailing edge 20 and the leading edge 18 of the blade 10. Typically, the root ends of the blade shell parts 24, 26 have a semi-circular or semi-oval outer cross-sectional shape.

Figure 3:
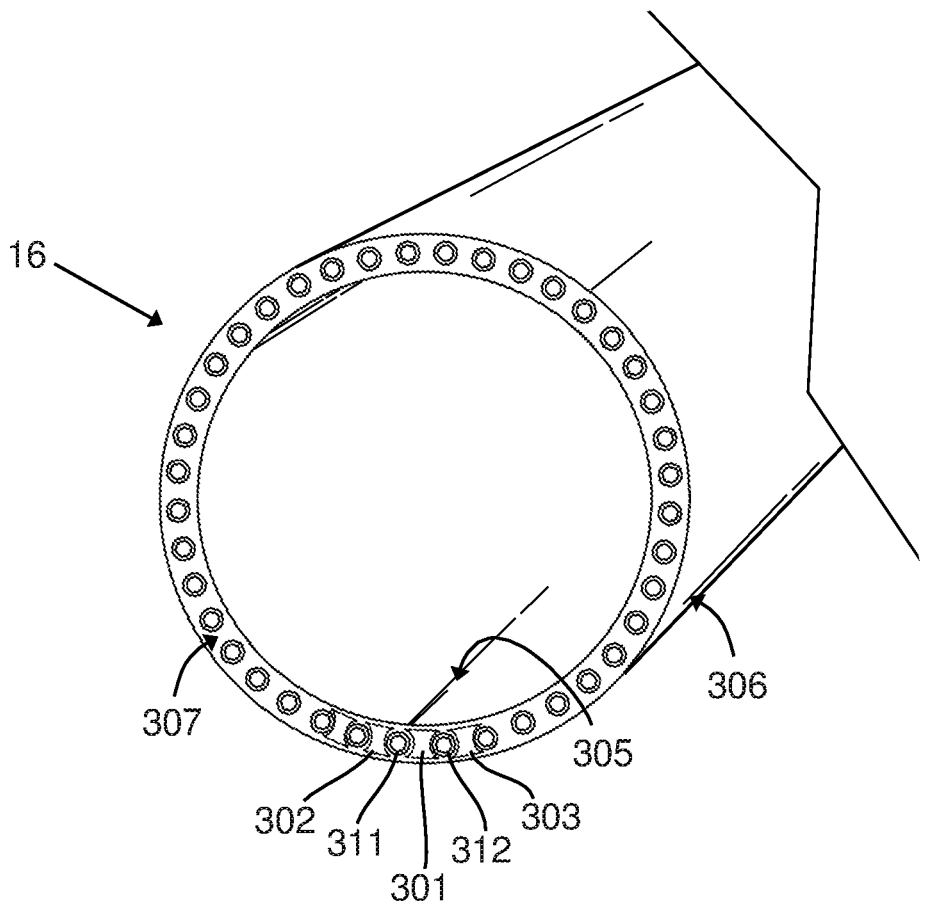
FIG. 3 schematically illustrates the root end of a wind turbine blade.

FIG. 3 illustrates the root end 16 of the wind turbine blade 10 shown in FIGS. 1 and 2. Bushings 311, 312 form part of the shell of the blade 10 at the root end 16. The bushings 311, 312 are mutually separated by retaining material 301, 302, 303, comprising for instance pultruded wedges, located between an inner sidewall 405 (shown in FIG. 4 and FIG. 5A) and an outer sidewall 406 (shown in FIG. 5A). The retaining material 301, 302, 303 surrounding the bushings 311, 312 is accessible by forming an opening in the surface 305 of the inner sidewall 405, in the surface 306 of the outer sidewall 406, or in the blade mounting interface 307 that faces the wind turbine hub when the blade is mounted on the hub.

Figure 4:
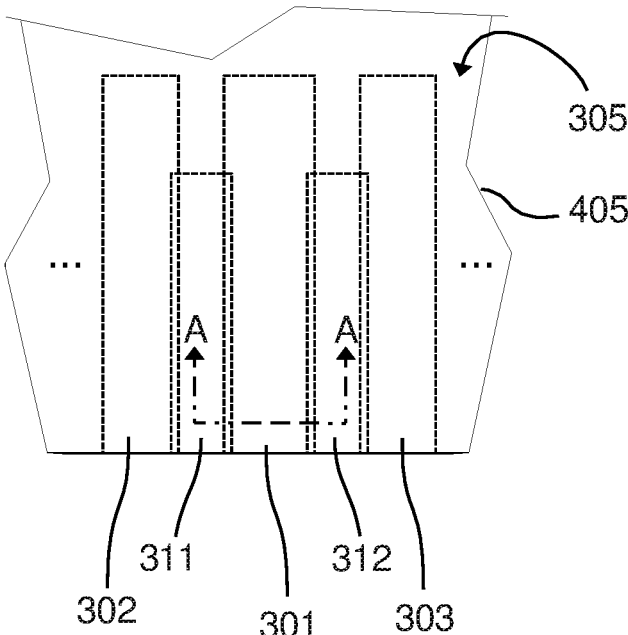
FIG. 4 illustrates a cut-out from the root end of a wind turbine blade comprising bushings and retaining material, seen from inside the wind turbine blade.

FIG. 4 illustrates a cut-out from the wind turbine blade comprising bushings 311, 312 and retaining material 301, 302, 303, including first retaining material 301 located between bushings 311 and 312. The lines indicating the bushings and the retaining material are dashed because they are located between an inner sidewall 405 having a surface 305, shown in the figure, and an outer sidewall 406 (shown in FIG. 5A). The cross-section A-A indicated in FIG. 4 is illustrated in FIG. 5A.

Figure 5A:
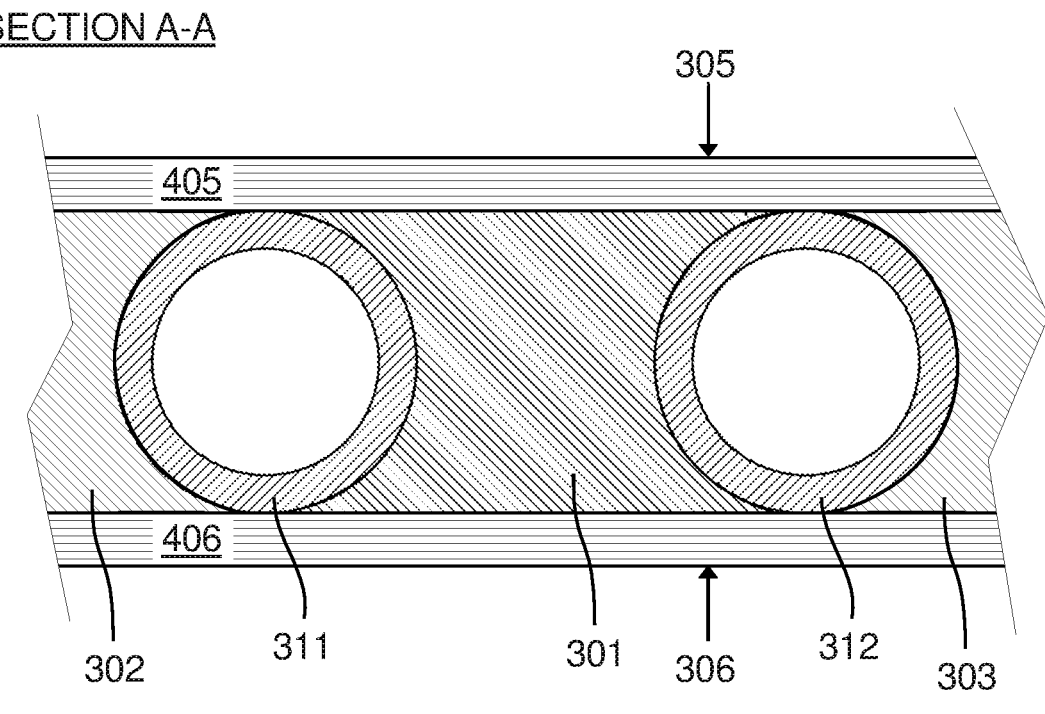
FIGS. 5A-5B illustrate a cross-section of bushings and retaining material in the root end.

FIG. 5A. illustrates the cross-section A-A indicated in FIG. 4 for a defect-free part of the root end. All elements are in contact and adhered together by an adhesive, such as a resin. It illustrates the inner sidewall 405 and the outer sidewall 406 between which the bushings 311, 312 and retaining material 301, 302, 303 are located. The figure is merely exemplary of a cross-section of part of a root end. The inner sidewall 405 and the outer sidewall 406 are illustrated as separate layers and retaining material 301, 302, 303 is illustrated as being separate elements. However, retaining material and sidewalls can also be made in many other ways. Thus, the element 301 is representative of retaining material located between bushings 311 and 312, however it is formed. Similarly, the sidewall can be made in a number of ways. Independent on the method of their fabrication, they form sidewalls between which the bushings and retaining material are located.

In a defect-free root end, the retaining elements 301, 302, 303 and bushings 311, 312 and sidewalls 405, 406 are in firm and tight contact, without any cavities (such as air pockets). This provides a strong and secure connection between the blade 10 and the wind turbine hub 8 (shown in FIG. 1). However, during operation, defects, such as air gaps, may eventually form due to the high loads exerted on the root end. Such defects in the root end may potentially lead to critical failure of the blade. Gaps allow the different element 301, 302, 303, 311, 312, 405 and 406 in the root end to move relative to one another, increasing the gaps and weakening the root end 16 further. To prevent or mitigate this scenario, adhesive can be added in accordance with embodiments of the present invention.

Figure 5B:
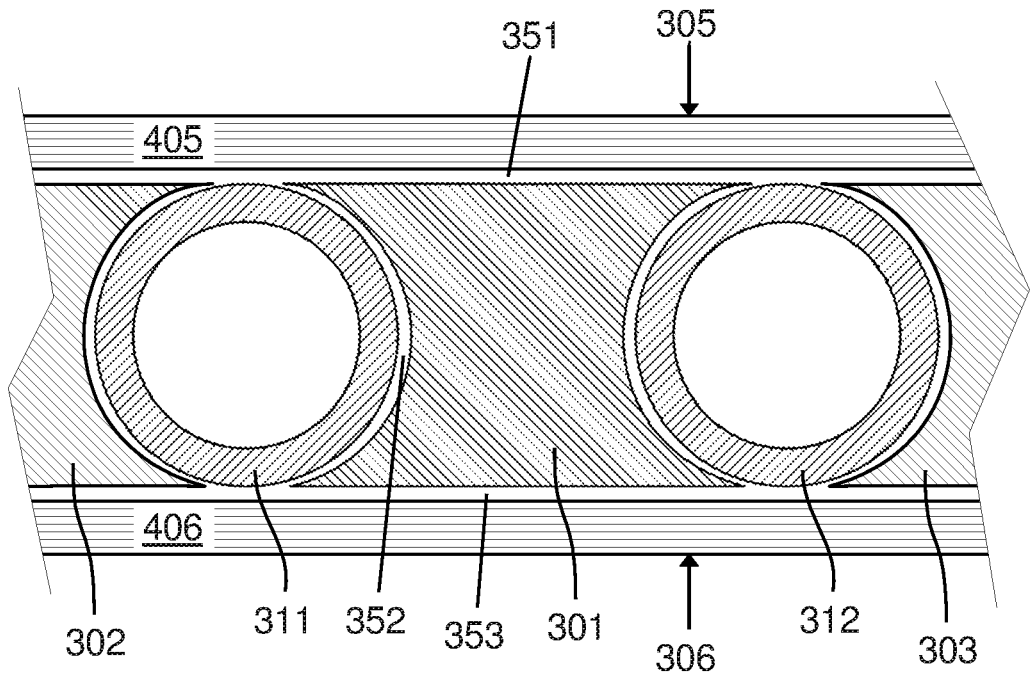

Section A'-A' in FIG. 5B illustrates in an exaggerated manner a number of gaps (cavities) 351, 352, 353 that may form or exist in the root end. The gaps reduce the strength and allow movement of the elements relative to one another to further weaken the structure. Typically, the defects are minor (yet important). In some cases, only a single defect type is present, such as a delamination between a bushing and a retaining element or between a retaining element and the inner or outer sidewall.

Figures 6, 7:
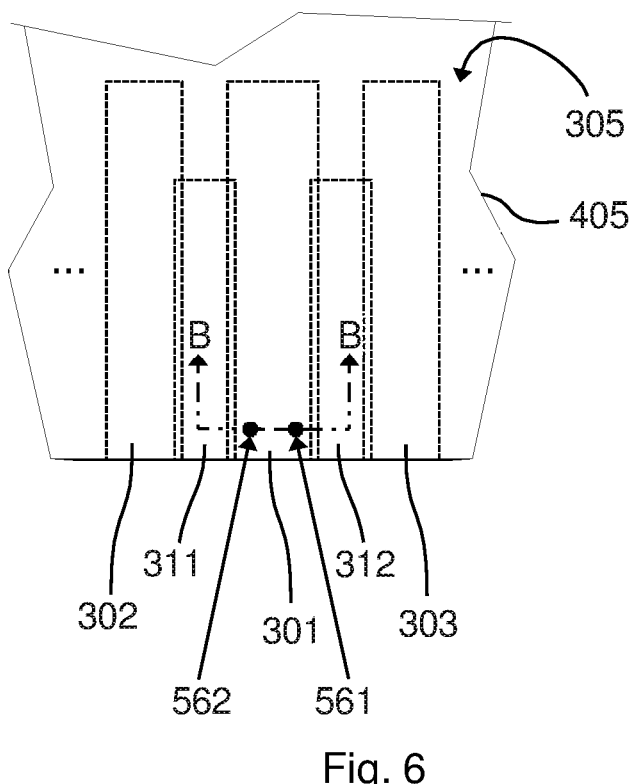
FIG. 6 illustrates a cut-out from the wind turbine blade comprising bushings and retaining material, seen from inside the wind turbine blade, with channels for reinforcing the root end.
FIGS. 7-17 illustrate methods for reinforcing the root end of a wind turbine blade.

FIG. 6 illustrates the cut-out of FIG. 4, with the addition of two channels 561, 562 formed through the surface 305 of the inner sidewall 405. The channels 561, 562 extend into the first retaining element 301, allowing injection of an adhesive. The cross-section B-B indicated in FIG. 6 is illustrated in FIG. 7.

FIG. 7 illustrates the cross-section B-B indicated in FIG. 6. For illustration purposes, the channels 561, 562 are formed to both coincide with the cross-section B-B. They may instead be displaced in a longitudinal direction of the bushing 311. As seen in the example in FIG. 7, both of the channels 561 and 562 extend through the inner sidewall 405 and the first retaining element 301. This provides fluid communication with the cavity 353 between the outer sidewall 406 and the first retaining element 301, allowing adhesive to be introduced into the cavity. Channel 561 is an injection channel through which adhesive can be provided. Channel 562 is a pressure release channel that provides a conduit for the adhesive, allowing the adhesive to (relatively) easily flow into the structure.

Figure 8:
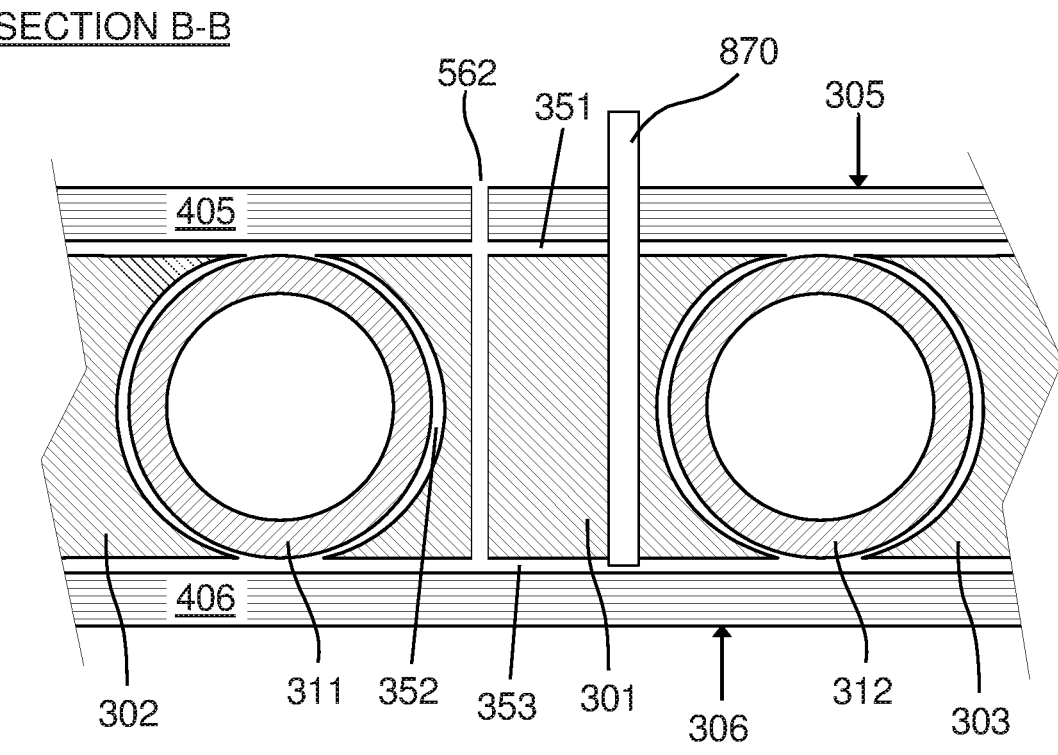

FIG. 8 illustrates insertion of an injection packer 870 in the injection channel 561, which can facilitate injection of adhesive, especially adhesive with a high viscosity.

Figure 9:
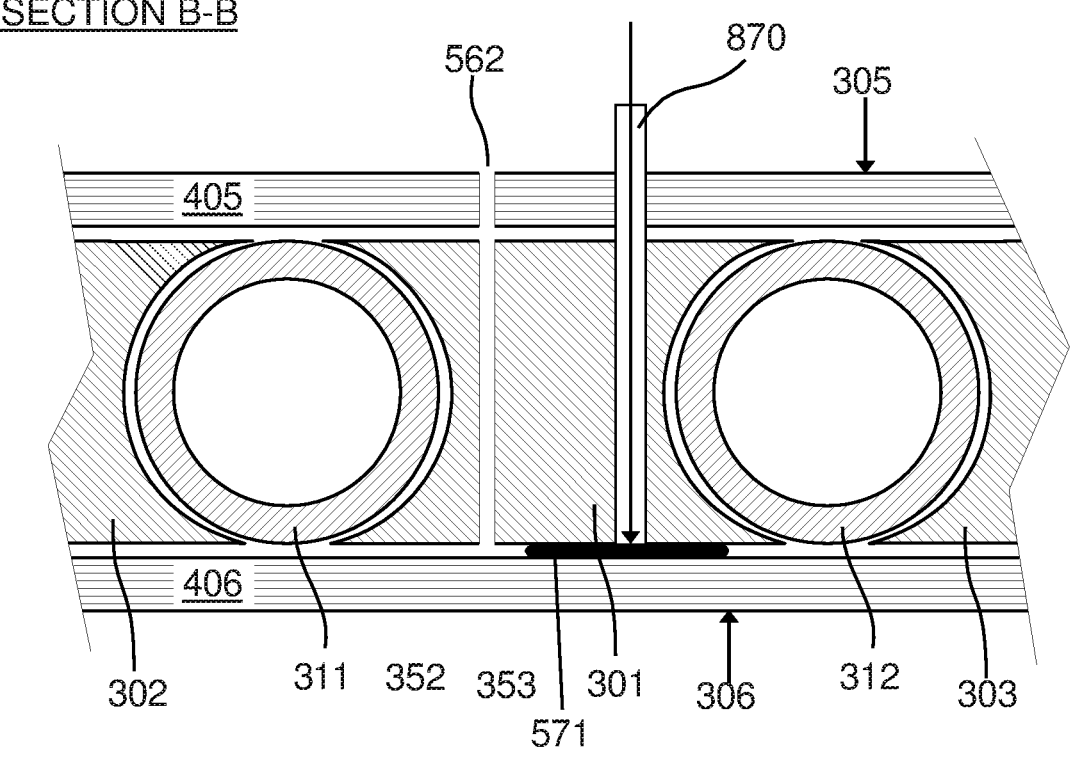

FIG. 9 illustrates adhesive being injected through the injection packer 870 and having filled part of the cavity 353 located between the first retaining material 301 and the outer sidewall 406. The flow of adhesive inside the injection packer 870 is illustrated with an arrow. The adhesive having filled part of the cavity 353 is illustrated with reference 571. Once the adhesive material has cured, the parts of the root end containing the injected adhesive material have been reinforced.

Figure 10:
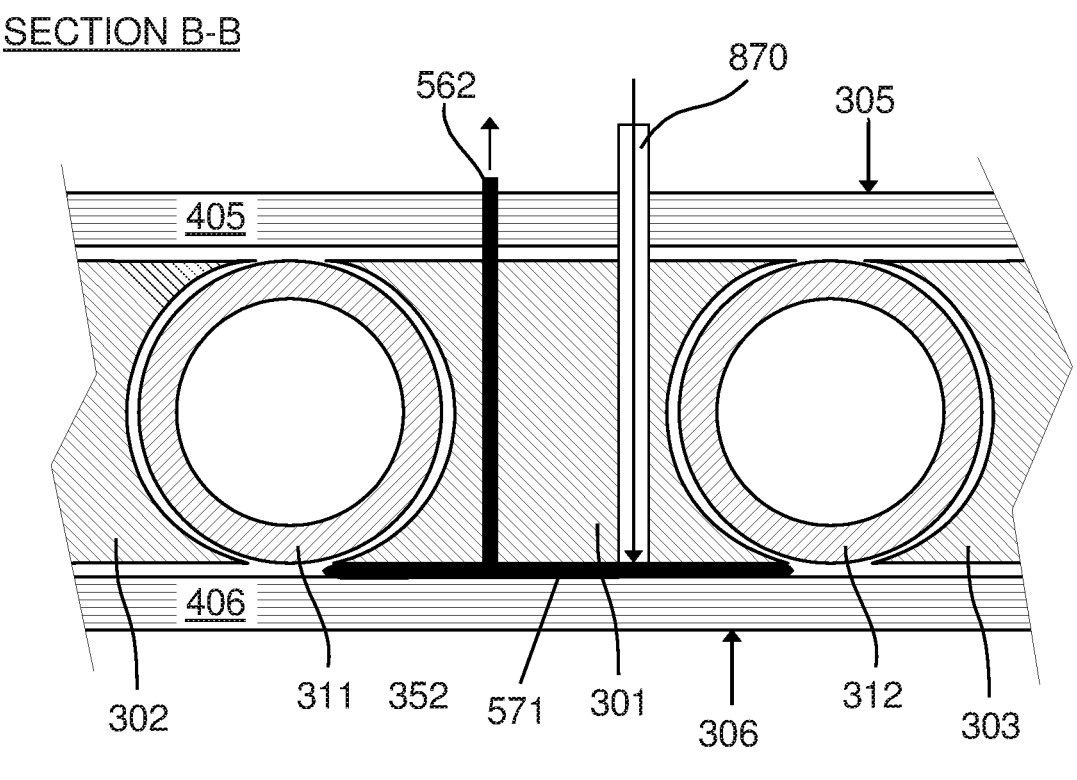

FIG. 10 illustrates how continued injection of adhesive fills even more of the cavity 353 and how adhesive has also entered the pressure release channel 562 and filled it. The flow of adhesive out of the pressure release channel 562 is illustrated with an arrow. The result is that the cavity 353 that constituted a weakness has been reinforced. Furthermore, the pressure release channel 562 is filled with adhesive, repairing the pressure release channel 562 formed to allow the adhesive to flow. Furthermore, the injection packer 870 is firmly attached in the injection channel 561 and is filled with adhesive. The injection packer 870 filled with adhesive provides strength in place of the material that was removed when the forming the injection channel 561.

In some cases, the process can continue either until adhesive material fills part of the pressure release channel 562 or the entire pressure release channel 562, or until adhesive material overflows the pressure release channel 562, as is the case illustrated in FIG. 10. Adhesive material that has overflowed the pressure release channel 562 is preferably removed, for instance before having fully cured.

In this way, the cavity 353 has been eliminated and the channels reinforced by injection packer and adhesive. Once the adhesive material has cured, the root end is reinforced in the corresponding region.

Figure 11:
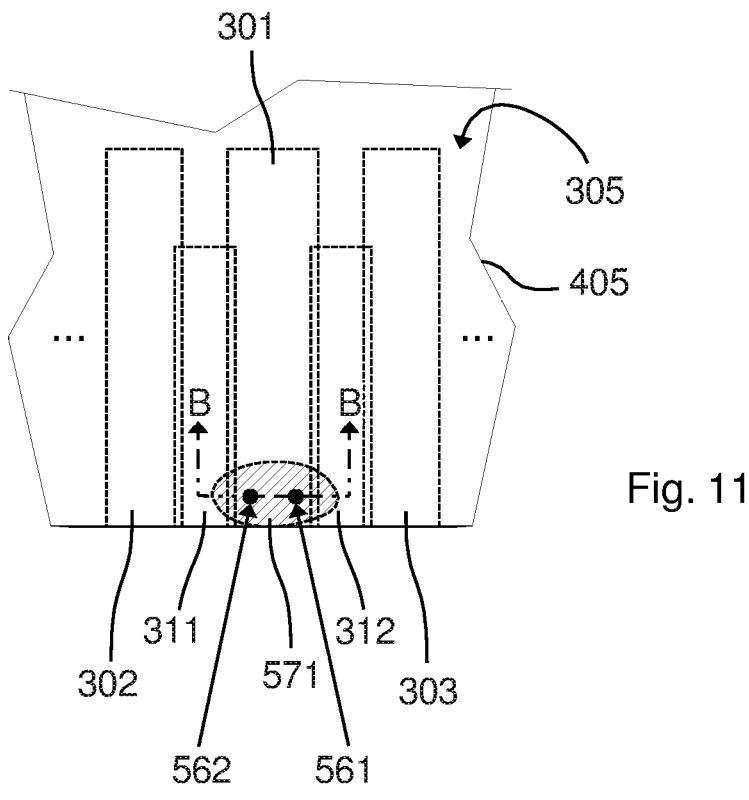

FIG. 11 corresponds to the cut-out shown in FIG. 6, further showing the adhesive 571 (also shown in FIG. 10) distributed in a region around the injection channel 561 and pressure release channel 562.

Figure 12:
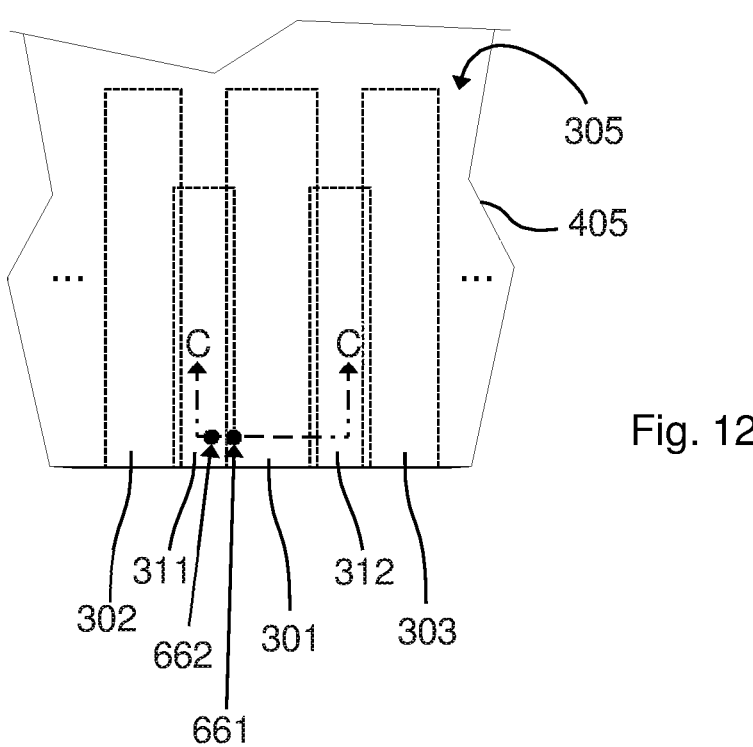

FIG. 12 illustrates another configuration of channels. The injection channel 661 is positioned to reach a cavity at the interface between bushing 311 and retaining material 301. Pressure release channel 662 allows adhesive to flow in into and out of the structure. The cross-section C-C indicated in FIG. 12 is illustrated in FIG. 13.

Figure 13:
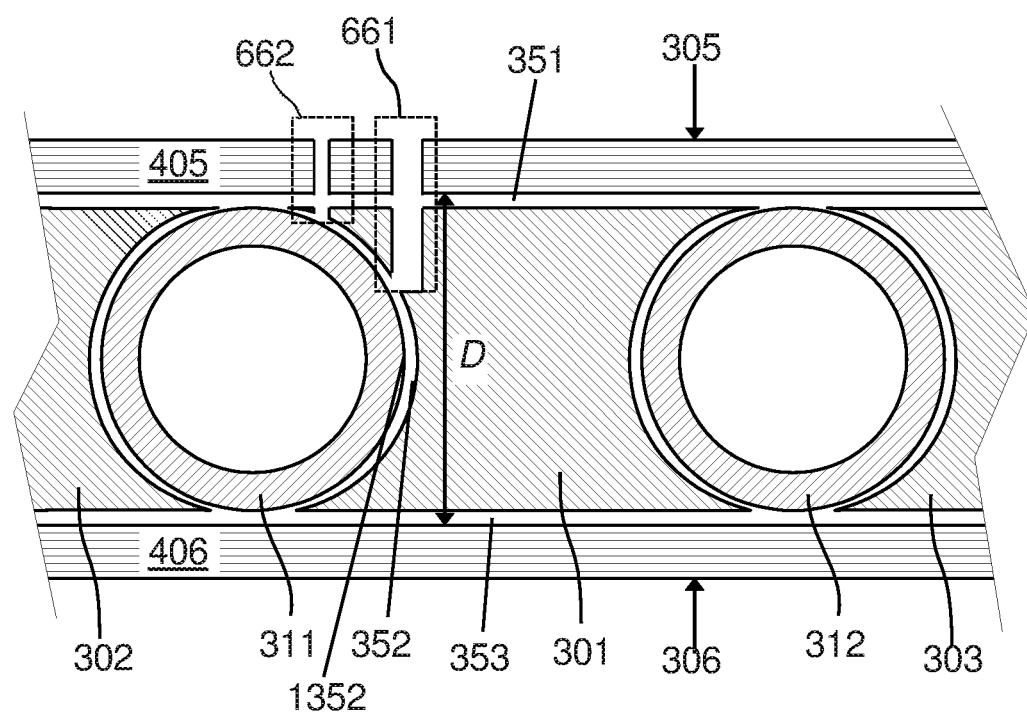

FIG. 13 illustrates the cross-section C-C indicated in FIG. 12. For illustration purposes, the channels 661, 662 are formed to both coincide with the cross-section C-C. They may instead be displaced in a longitudinal direction of the bushing 311. As seen in the example in FIG. 13, both of the channels 661 and 662 extend through the inner sidewall 405 and the first retaining element 301. This provides fluid communication with the cavity 352, which is a cavity located between the retaining material 301 and the bushing 311. The injection channel 661 is aimed at the point 1352 of the bushing located between 0.3 D to 0.7 D from the first sidewall 405 (about 0.37 D). In many cases, this is representative of an advantageous position for injecting adhesive when there is a gap between the first retaining material 301 and the bushing 311.

Figure 14:
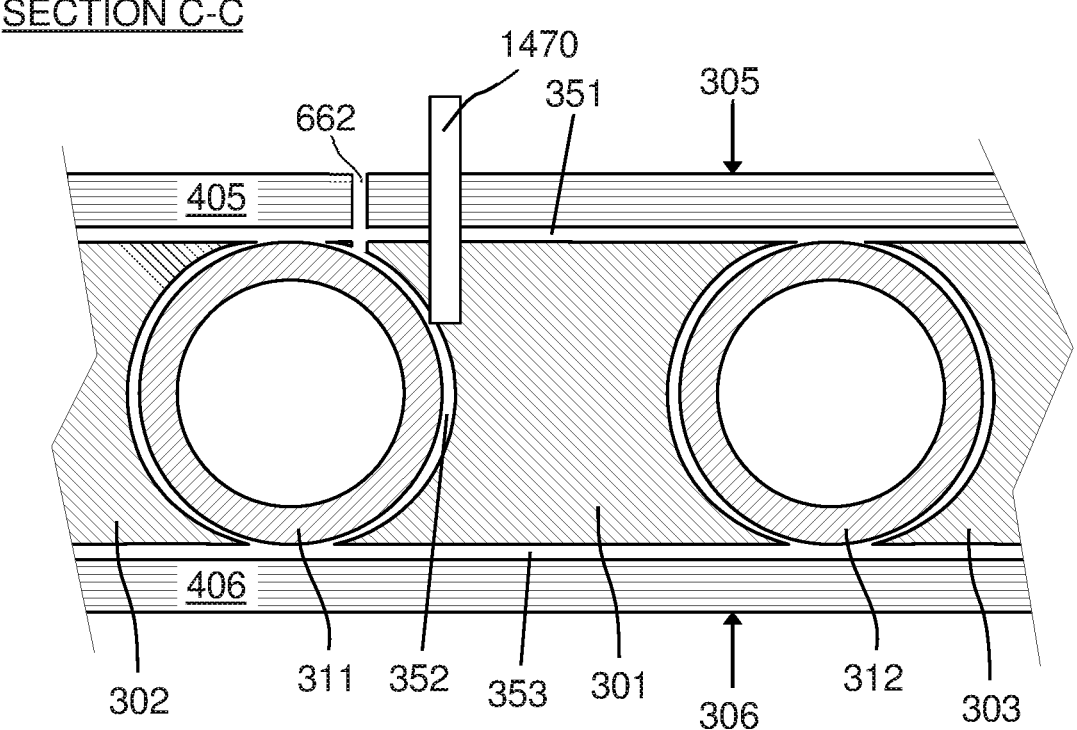

FIG. 14 illustrates insertion of an injection packer 1470 in the injection channel 661, which can facilitate injection of adhesive, especially adhesive with a high viscosity.

Figure 15:
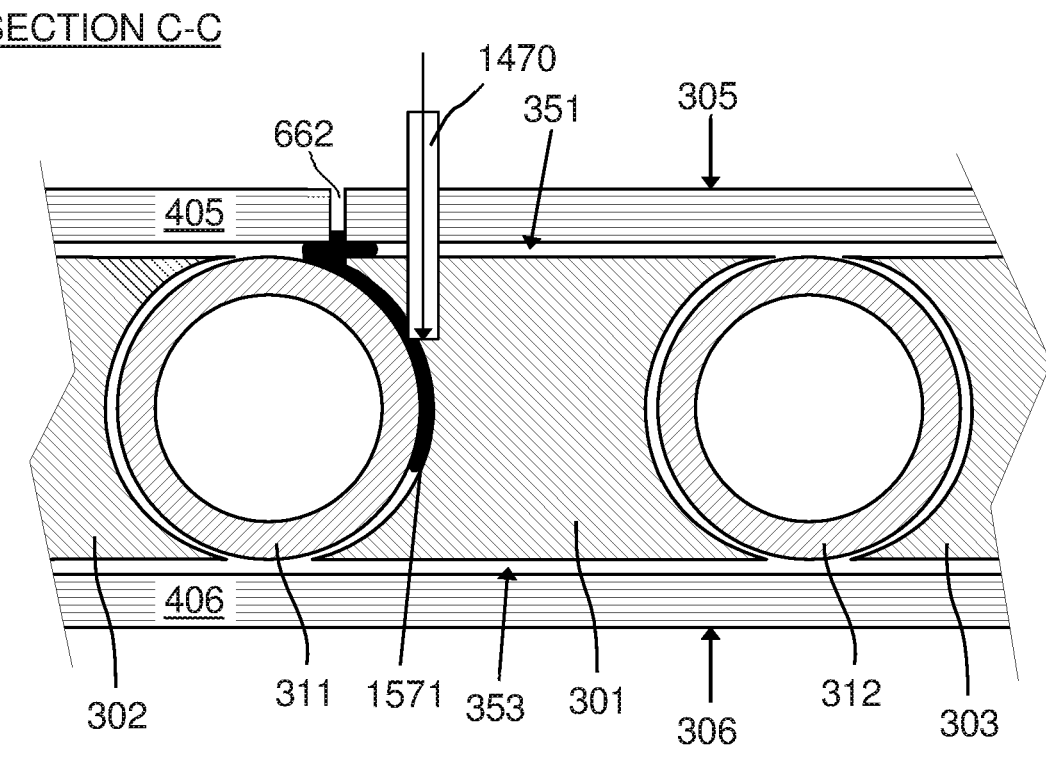

FIG. 15 illustrates adhesive being injected through the injection packer 1470 and having filled part of the cavity 352 located between the first retaining material 301 and the bushing 311. The flow of adhesive inside the injection packer 870 is illustrated with an arrow. The adhesive having filled part of the cavity 352 (shown in FIG. 14) is illustrated with reference 1571. The adhesive has also filled part of cavity 351 and some of the pressure release channel 662.

Figure 16:
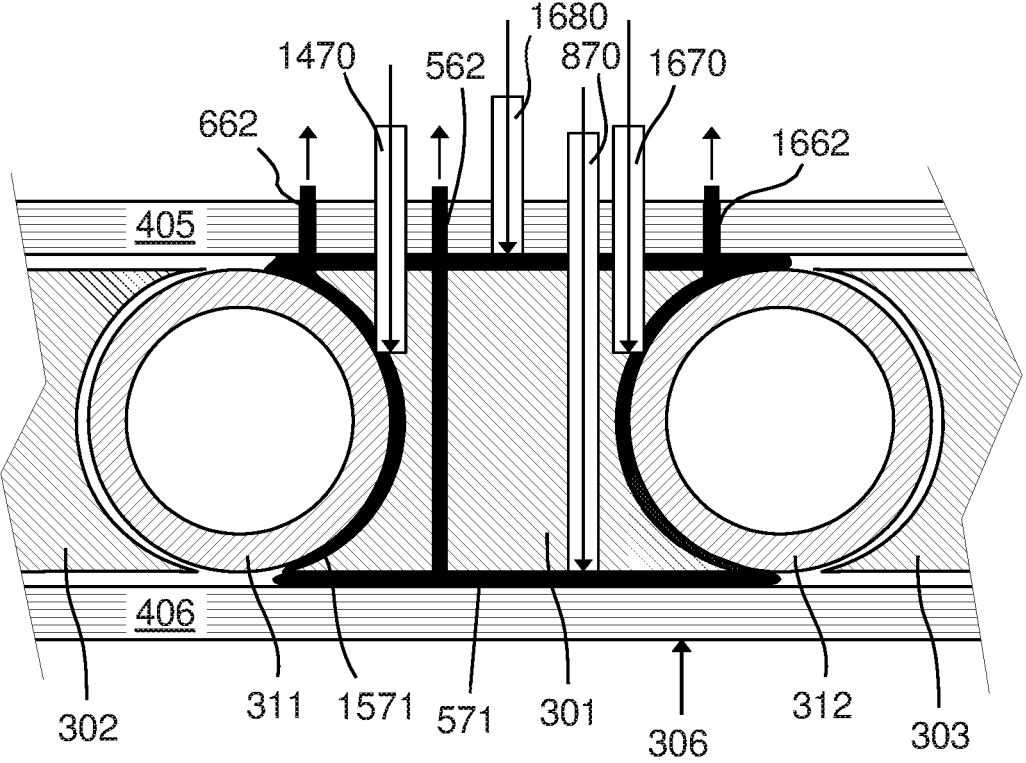

FIG. 16 illustrates in a compressed manner how a number of injection channels with injection packers 870 (from FIG. 8), 1470 (from FIG. 14), and additional injection packers 1670 and 1680 can address different cavities and thereby reinforce the structure as needed. An additional pressure release channel 1662 is also provided for exemplification. The injection channels and pressure release channels are illustrated as being located in the same cross-section. Injection channels and pressure release channels are located where needed, and a flow direction component along a longitudinal axis of a bushing is often required, for instance for a cavity that extends along a bushing.

Figure 17:
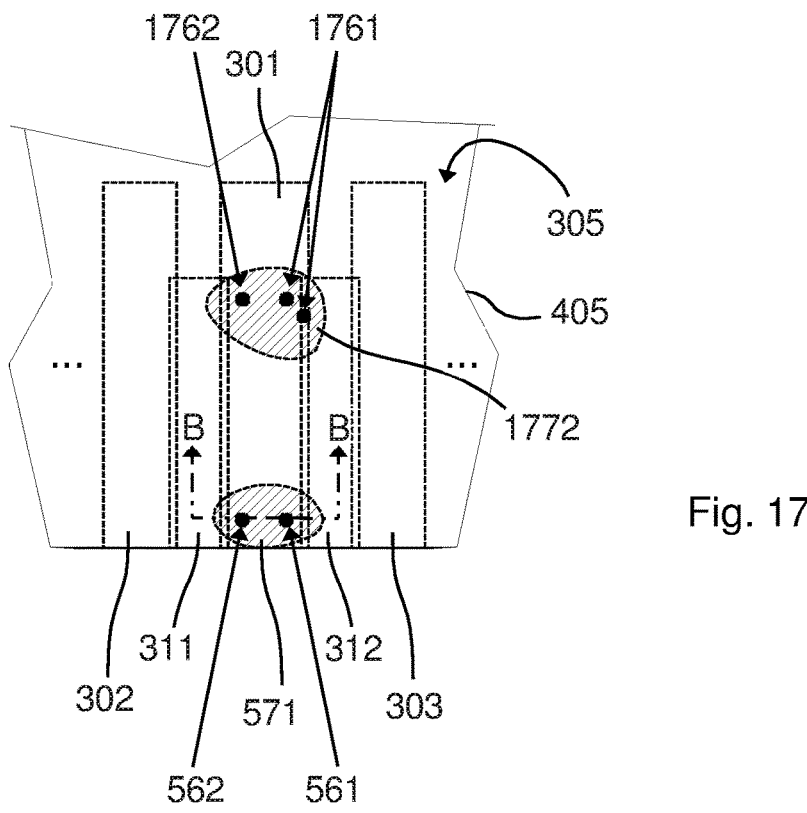

FIG. 17 illustrates the cut-out of FIG. 6 with the addition of injection channel 1761 and pressure release channel 1762. Injection channel 561 and pressure release channel 562 allow for the provision of adhesive 571, as discussed and shown in relation to FIGS. 9,10, and 16. Injection channel 1761 and pressure release channel 1762 allow for the provision of adhesive 1772. In the example in FIG. 17, the adhesive 571 is provided at a first end of the bushings 311 and 312, and the adhesive 1772 is provided at a second end of the bushings 311 and 312. The ends of bushings may be more susceptible to weakening, and therefore these portions are advantageously reinforced.

The root end may be treated proactively, or cavities may be identified using ultrasound equipment and reinforced in response. Ultrasound measurement equipment could be permanently installed to monitor a specific part of the root end, representative or particularly highly loaded during operation. The monitoring is advantageously performed automatically by the ultrasound measurement equipment.

The equipment can communicate measurements to a remote facility, where it is analysed to identify defects. If a defect is identified, personnel can visit the wind turbine blade and repair it as necessary. In some cases, a robot may alternatively be used.

Figure 18:
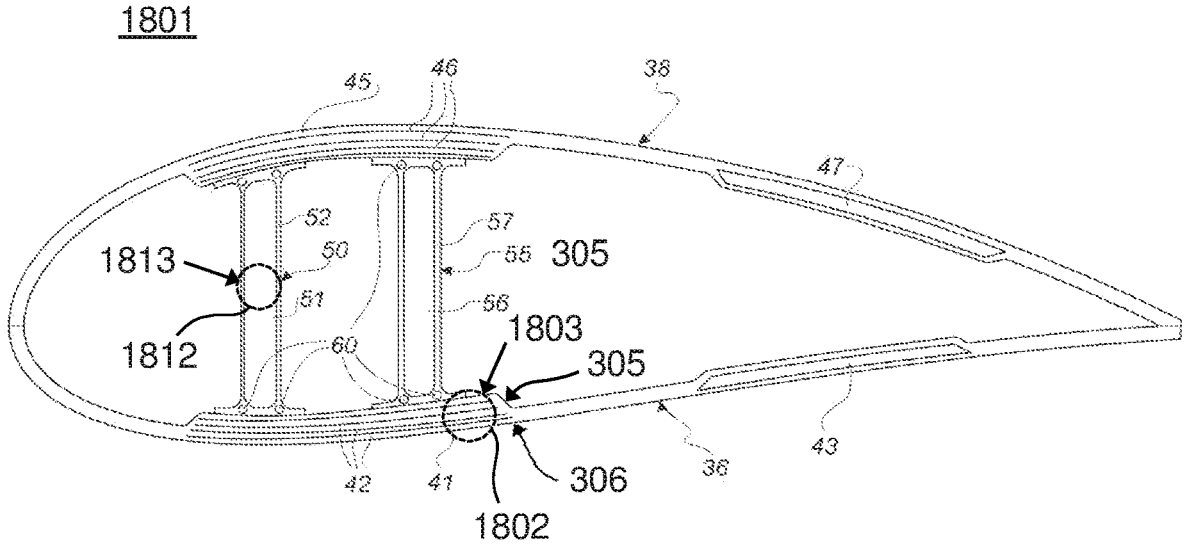
FIG. 18 illustrates an exemplary cross-section of a wind turbine blade.

FIG. 18 shows a schematic view of a cross-section of the blade along the line I-I shown in FIG. 2. As previously mentioned, the blade 10 comprises a pressure side shell part 36 and a suction side shell part 38. The pressure side shell part 36 may comprise a spar cap 41, also called a main laminate, which constitutes a load-bearing part of the pressure side shell part 36. The spar cap 41 may comprise a plurality of fibre layers 42, such as unidirectional fibres aligned along the longitudinal direction of the blade in order to provide stiffness to the blade. The suction side shell part 38 also comprises a spar cap 45 comprising a plurality of fibre layers 46. The pressure side shell part 36 may also comprise a sandwich core material 43 typically made of balsawood or foamed polymer and sandwiched between a number of fibre-reinforced skin layers. The sandwich core material 43 is used to provide stiffness to the shell in order to ensure that the shell substantially maintains its aerodynamic profile during rotation of the blade. Similarly, the suction side shell part 38 may also comprise a sandwich core material 47.

The spar cap 41 of the pressure side shell part 36 and the spar cap 45 of the suction side shell part 38 are connected via a first shear web 50 and a second shear web 55. The shear webs 50, 55 are in the shown embodiment shaped as substantially I-shaped webs. The first shear web 50 comprises a shear web body and two web foot flanges. The shear web body comprises a sandwich core material 51, such as balsawood or foamed polymer, covered by a number of skin layers 52 made of a number of fibre layers. The second shear web 55 has a similar design with a shear web body and two web foot flanges, the shear web body comprising a sandwich core material 56 covered by a number of skin layers 57 made of a number of fibre layers. The sandwich core material 51, 56 of the two shear webs 50, 55 may be chamfered near the flanges in order to transfer loads from the webs 50, 55 to the main laminates 41, 45 without the risk of failure and fractures in the joints between the shear web body and web foot flange. However, such a design will normally lead to resin rich areas in the joint areas between the legs and the flanges. Further, such resin rich area may comprise burned resin due to high exothermic peaks during the curing process of the resin, which in turn may lead to mechanical weak points.

In order to compensate for this, a number of filler ropes 60 comprising glass fibres may be arranged at these joint areas. Further, such ropes 60 will also facilitate transferring loads from the skin layers of the shear web body to the flanges. However, according to embodiments of the invention, alternative constructional designs are possible.

The different blade parts shown in FIG. 18 are susceptible to weakening over time as the blade moves and the forces acting on a given blade part constantly change both direction and magnitude.

As one example, the spar cap fibre layers 42 in the wind turbine shell may experience delamination, which can accelerate fatiguing. A defect in the portion 1802 of the spar cap may for instance be located in a region between an inner surface 305 and an outer surface 306 of the blade (see also FIG. 3). The defect may for instance have been identified during an ultrasound inspection from the outside or from the inside. To arrest fatiguing caused by the delamination, the defect must be reinforced. In accordance with embodiments of the invention, a first injection channel and a first pressure release channel are formed to access the defect, the first injection channel and the first pressure release channel being formed to be in fluid communication via the defect. In accordance with embodiments of the invention, the channels are formed in a direction from inside the blade, as illustrated by arrow 1803. Accessing the defect from the interior of the blade is safer. Furthermore, there is no need for repairing the gelcoat on the outside of the blade.

Another defect may for instance arise in a portion 1812 of the shear web 50, as indicated in FIG. 18. It may have been identified for instance during an ultrasound inspection from the inside. Like most other parts of the blade, the shear web is essential in forming the blade's strength, and structural defects are reinforced to maintain structural integrity. In accordance with the invention, an injection channel and a pressure release channel are formed to access the defect, the injection channel and the pressure release channel being formed to be in fluid communication via the defect. In accordance with embodiments of the invention, the channels are formed from the inside of the blade, as illustrated by arrow 1813, which indicates a possible direction for forming an injection channel and similarly a pressure release channel. Accessing the defect from the inside of the blade is safer, and there is no subsequent need to repair the gelcoat on the outside of the blade.

Figures 19A, 19B, 19C:
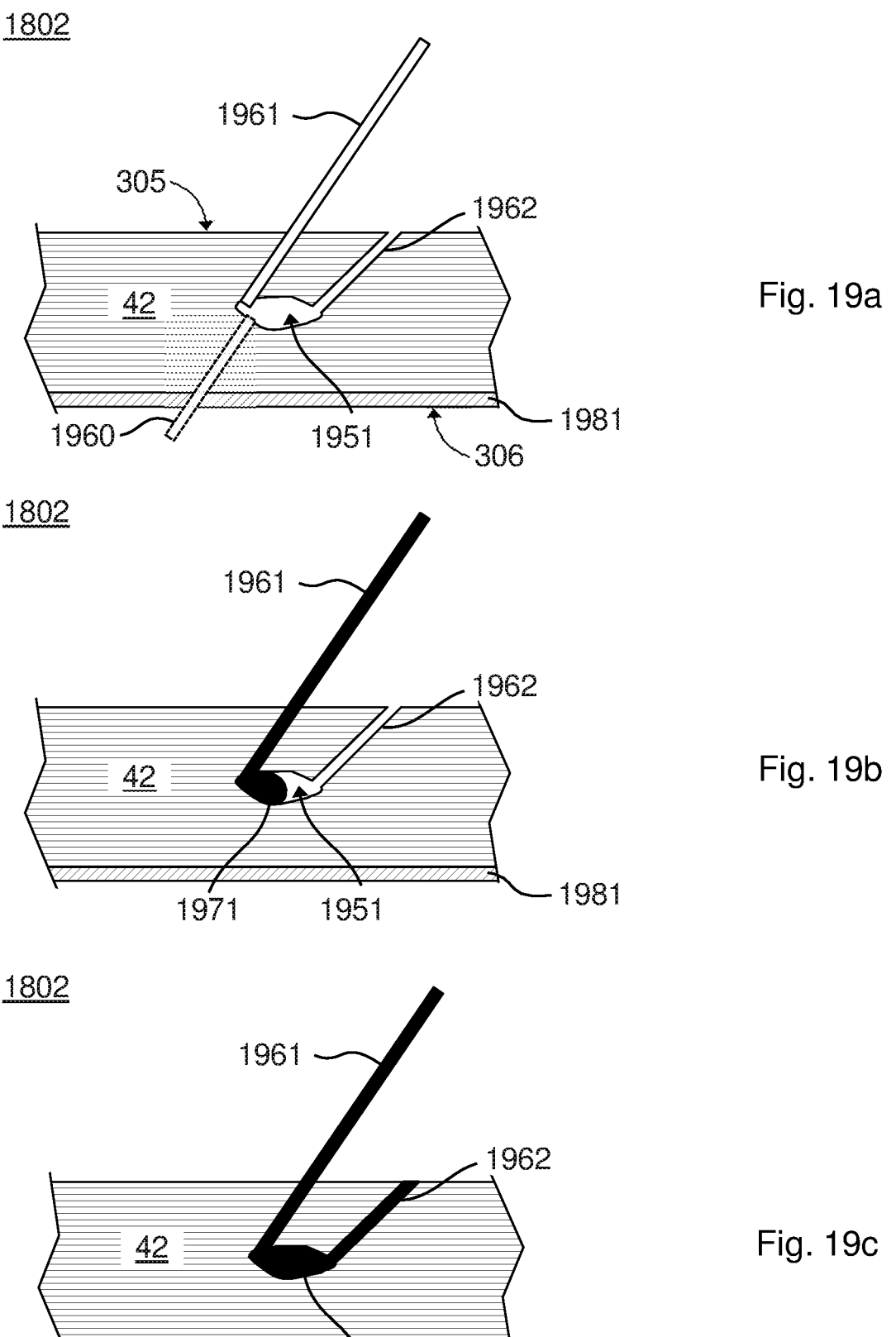
FIG. 19 illustrates reinforcement of a wind turbine blade shell.

Reinforcement of the spar cap is illustrated in more detail in FIGS. 19*a*-19*c*. As described in relation to FIG. 18, the spar cap 41 may have a defect between the inner surface 305 and the outer surface 306 of the blade in the region 1802, for instance a delamination defect 1951 in the fibre layers 42 as illustrated in FIG. 19*a*. The defect 1951 may allow fatiguing or creeping and must be eliminated.

In accordance with embodiments of the invention, an injection channel 1961 and a pressure release channel 1962 are formed from the inner surface 305 in fluid communication with the defect 1951. FIG. 19*a* also illustrates an imagined channel 1960 created from the outer sidewall 306. Forming a channel from the outer surface 306 will compromise the gelcoat 1981 that ensures a smooth, aerodynamic quality on the exterior of the blade. If the blade is reinforced from the outside, the gelcoat will have to be repaired both at the injection channel and at the pressure release channel. If an injection packer has been used, this must be removed as well, such as by sawing, which may lead to further gelcoat damage, such as from direct contact with a sawing tool and from mechanical vibrations created by the sawing. Embodiments of the invention overcome these problems. Also, working from the inside is safer for personnel. Safety features inside the blade can be taken advantage of, and strong winds are not an issue.

In some instances, the blade portion to be reinforced may not be accessible to personnel, and reinforcing from the outside may be unavoidable. However, where possible, reinforcing from the inside will have the advantages described above and requires fewer steps.

FIG. 19*a* illustrates use of an injection packer 1961 in the process. The injection packer makes it easier to inject adhesive, especially adhesive having a very high viscosity, and the injection packer itself provides strength and can be left in the part, in this case the spar cap 41, after the reinforcement process is complete.

FIG. 19*b* illustrates adhesive being injected into the injection channel/packer 1961 and entering the defect to alleviate the issues associated with the defect described above. The figures illustrate the cross-section I-I indicated in FIG. 1. In practice, the defect 1951 is three-dimensional, and the injection channel 1961 and the pressure release channel 1962 are placed such that adhesive reaches all parts of the defect 1951 In FIGS. 19*a*-19*c*, this is illustrated by channels that enter the defect 1951 from opposite ends of the defect.

As described above, the injection process may be continued until adhesive exits the pressure release channel 1962. This indicates that the defect 1951 has been eliminated.

FIG. 19*c* illustrates the reinforced portion 1802 of the spar cap 41. Adhesive 1971 fills the channels 1961 and 1962 and the defect 1951.

Figures 20A, 20B, 20C:
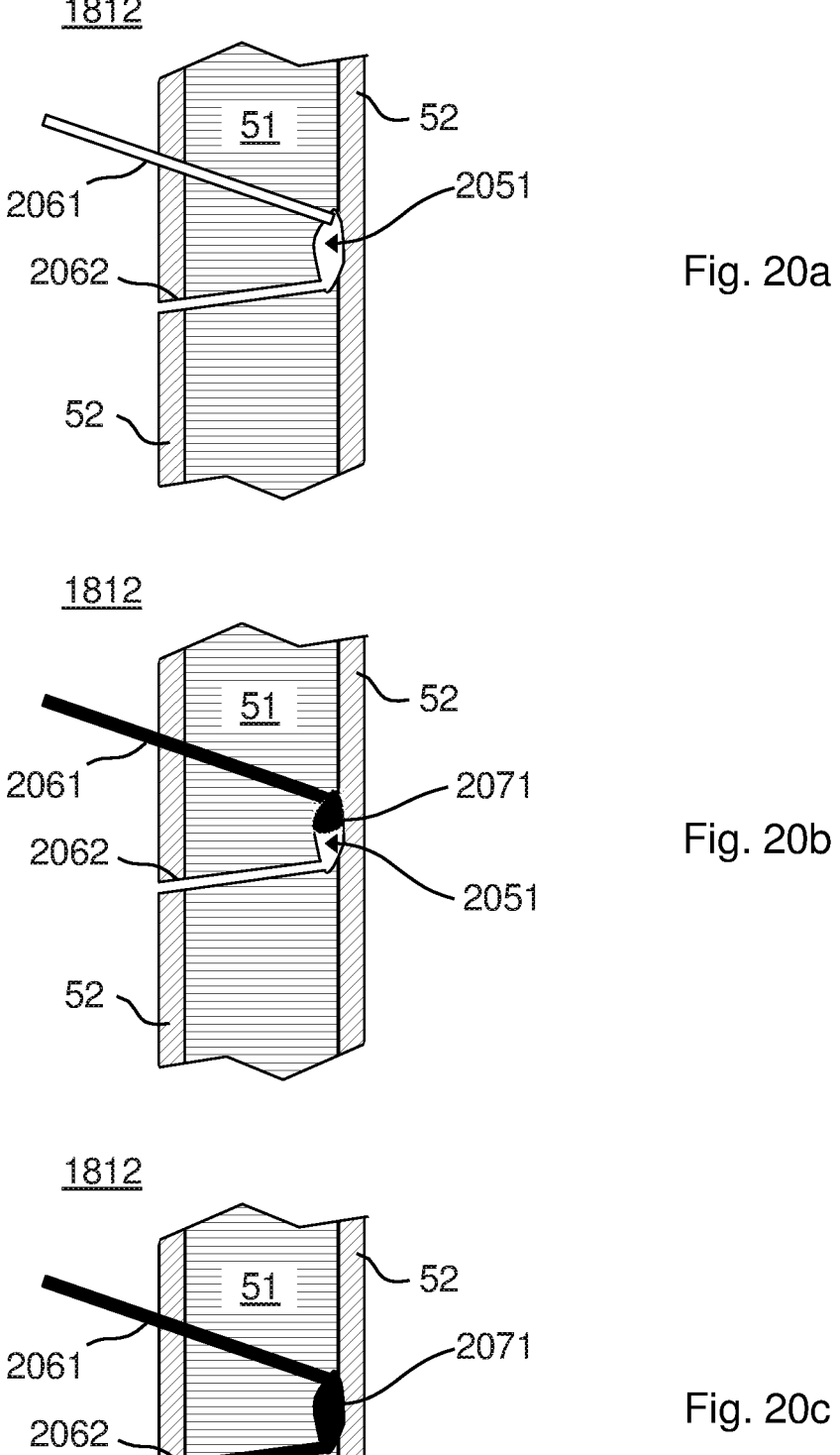
FIG. 20 illustrates reinforcement of a wind turbine blade shear web.

FIG. 20*a* illustrates reinforcement of a shear web in the wind turbine blade, such as to eliminate a defect in the region 1812 in shear web 50 shown in FIG. 18. Reinforcement of the shear web is illustrated in more detail in FIGS. 20a-20c.

In the present example, a defect 2051 is located at an interface between a core material 51 and skin layers 52, as shown in FIGS. 20a-20c.

In accordance with embodiments of the invention, an injection channel 2061 and a pressure release channel 2062 are formed in fluid connection with the defect 2051. FIG. 20a illustrates use of an injection packer 2061 in the process. The injection packer makes it easier to inject adhesive, especially adhesive having a very high viscosity, and the injection packer itself provides strength and can be left in the part, in this case the shear web 50, after the reinforcement process is complete.

FIG. 20b illustrates adhesive being injected into the injection packer 2061 and entering the defect 2051 to alleviate the issues associated with the defect, described above. FIGS. 20a-20c illustrate a cross-section. In practice, the defect 2051 is three-dimensional, and the injection channel 2061 and the pressure release channel 2062 are therefore placed such that adhesive reaches all parts of the defect 2051. In FIGS. 20a-20c, this is illustrated by channels that enter the defect 2051 from opposite ends.

As described above, the injection process may be continued until adhesive exits the pressure release channel 2062, which indicates that the defect has been eliminated entirely. FIG. 20c illustrates the reinforced spar cap 50.

Additional injection channels or pressure release channels may be formed in order to ensure that adhesive eliminates the defect entirely.

List of reference numerals

| | | | |
|---|---|---|---|
| | | 34 | airfoil region |
| A-A | cross-section in sidewall of wind turbine blade | 40 | shoulder |
| | | 41 | spar cap |
| A'-A' | cross-section in sidewall of wind turbine blade | 42 | fibre layers |
| | | 43 | sandwich core material |
| B-B | cross-section in sidewall of wind turbine blade | 45 | spar cap |
| | | 46 | fibre layers |
| C-C | cross-section in sidewall of wind turbine blade | 47 | sandwich core material |
| | | 50 | first shear web |
| D | distance between inner sidewall and outer sidewall | 51 | core member |
| | | 52 | skin layers |
| I-I | wind turbine blade cross-section | 55 | second shear web |
| L | longitudinal axis of wind turbine blade | 56 | sandwich core material of second shear web |
| 2 | wind turbine | 57 | skin layers of second shear web |
| 4 | tower | 60 | filler ropes |
| 6 | nacelle | 62 | reinforcing structure |
| 8 | hub | | |
| 10 | wind turbine blade | 301 | first retaining material |
| 11 | first blade shell part (pressure side) in airfoil region | 302 | second retaining material |
| | | 303 | third retaining material |
| 12 | second blade shell part (suction side) in airfoil region | 305 | surface of inner sidewall, inner surface of blade |
| 14 | blade tip, tip end | 306 | surface of outer sidewall, outer surface of blade |
| 16 | root end | | |
| 18 | leading edge | 307 | blade mounting interface |
| 20 | trailing edge | 311 | first bushing |
| 24 | first blade shell part (pressure side) at root end | 312 | second bushing |
| | | 351 | cavity, gap |
| 26 | second blade shell part (suction side) at root end | 352 | cavity, gap |
| | | 353 | cavity, gap |
| 28 | bond lines/glue joints | | |
| 30 | root region | 405 | inner sidewall |
| 32 | transition region | 406 | outer sidewall |
| | | 1680 | injection packer |
| 561 | first injection channel | | |
| 562 | first pressure release channel | 1761 | injection channels |
| 571 | injected adhesive material | 1762 | pressure release channel |
| | | 1772 | injected adhesive material |
| 661 | injection channel | 1801 | wind turbine blade cross-section |
| 662 | pressure release channel | 1802 | spar cap region |
| 671 | injected adhesive material | 1803 | injection direction |
| | | 1812 | shear web region |
| 870 | injection packer | 1813 | injection direction |
| | | 1951 | spar cap defect |
| 1352 | first point of first bushing | 1961 | injection channel/packer |
| | | 1962 | pressure release channel |
| | | 1971 | adhesive |
| 1470 | injection packer | 1981 | gelcoat on outer surface |
| | | 2051 | shear web defect |
| 1571 | injected adhesive material | 2061 | injection channel/packer |
| | | 2062 | pressure release channel |
| 1662 | pressure release channel | 2071 | adhesive |
| 1670 | injection packer | | |

The invention claimed is:

1. A method for reinforcing a root end (16) of a wind turbine blade, the root end (16) comprising a plurality of bushings (311, 312) for attaching the wind turbine blade (10) to a wind turbine hub (8), each bushing being located between an inner sidewall (405) of the root end and an outer sidewall (406) of the root end (16), the plurality of bushings being mutually separated by retaining material (301, 302, 303), a first bushing (311) and a second bushing (312) of the plurality of bushings (311, 312) being separated by first retaining material (301), the method comprising:

(i) forming a first injection channel (561, 661) in the first retaining material (301), (ii) forming a first pressure release channel (562, 662) in the first retaining material (301), wherein the first pressure release channel (562, 662) is formed to be in fluid communication with the first injection channel (561) in a region between the inner sidewall (405) and the outer sidewall (406), and (iii) injecting adhesive material (571, 671) into the first injection channel (561) at least until adhesive material enters the formed first pressure release channel (562).

2. The method in accordance with claim 1, wherein the first injection channel and the first pressure release channel are formed through a first sidewall (405, 406) of the root end, wherein the first sidewall is the inner sidewall (405) or the outer sidewall (406) of the root end.

3. The method in accordance with claim 1, wherein the first injection channel and/or the first pressure release channel is formed through a blade mounting interface (307) of the root end.

4. The method in accordance with claim 1, further comprising a step of inserting an injection packer (870) into the first injection channel (561) before the step of injecting adhesive material into the first injection channel (561).

5. The method in accordance with claim 1, wherein the first retaining material (301) comprises a pultruded fibre-reinforced composite element.

6. The method in accordance with claim 1, wherein the adhesive material is provided at least until adhesive material entirely fills the first pressure release channel (562).

7. The method in accordance with claim 1, further comprising repeating step (i) one or more times to provide corresponding one or more additional injection channels (661, 761) (661,761) for injecting adhesive material.

8. The method in accordance with claim 1, further comprising repeating step (ii) one or more times to provide corresponding one or more additional pressure release channels (662, 762), the one or more additional pressure release channels being formed to be in fluid communication with the first injection channel (561) and/or with an additional injection channel (661,761).

9. The method in accordance with claim 2, wherein the first injection channel (561) is in fluid communication with a cavity (351, 352, 353) located between the first sidewall (405) and a second sidewall (406).

10. The method in accordance with claim 2, wherein the first injection channel (561) is in fluid communication with a cavity (351) located between the first sidewall (405) and the first retaining material (301).

11. The method in accordance with claim 1, wherein the first injection channel (561) is in fluid communication with a cavity (352) located between the first retaining material (301) and the first bushing (311).

12. The method in accordance with claim 11, wherein the first injection channel is aimed towards a first point (1352) of the first bushing (311), a distance between the inner sidewall and the first point of the first bushing being in the range 0.3-0.7 times a distance (D) between the inner sidewall (405) and the outer sidewall (406) at a location of the first point (1352).

13. The method in accordance with claim 1, wherein the first injection channel (561) is in fluid communication with a cavity (353) located between the second sidewall (406) and the first retaining material (301).

14. The method in accordance with claim 1, further comprising:

locating a first cavity between the inner sidewall (405) and the outer sidewall (406) by use of ultrasound equipment, the first injection channel (561) then being formed in fluid communication with the first cavity to allow injection of adhesive material into the first cavity, the first pressure release channel (562) being formed in fluid communication with the first cavity.

15. The method in accordance with claim 1, wherein the first injection channel (561) is formed near a first end of the first bushing (311), the method further comprising performing step (i) at a location near a second end of the first bushing (311), thereby forming a corresponding second injection channel (761) near the second end of the first bushing.

16. The method in accordance with claim 1, wherein the first injection channel (561, 761) is formed within a distance of 150 mm from a first end of the first bushing (311) and/or a second end of the first bushing (311).

17. The method in accordance with claim 1, wherein the method is performed while the wind turbine blade is attached to a hub (8) of a wind turbine.

18. The method in accordance with claim 17, further comprising:

(iv) prior to steps (i) to (iii), monitoring a specific part of the root end between the inner sidewall (405) and the outer sidewall (406) using ultrasound measuring equipment providing a corresponding ultrasound measurement, (v) based on the ultrasound measurement obtained in step (iv), determining that a defect has formed in the specific part of the root end, and (vi) reinforcing the specific part of the root end (16) in response to determining that the defect has formed.

19. The method in accordance with claim 18, wherein the monitoring is performed automatically by the ultrasound measurement equipment.

20. The method in accordance with claim 18, wherein the ultrasound measurement is transmitted to a first remote location and the determining that a defect has formed is determined at the first remote location.

21. The method in accordance with claim 20, wherein the ultrasound measurement is transmitted to the first remote location in response to receipt of an ultrasound measurement request signal.

22. The method in accordance with claim 18, wherein at least a part of the adhesive material is injected with a pressure of at least 200 bar.

23. The method in accordance with claim 18, wherein the adhesive material has a viscosity in the range 35-45 Pa·s at 25° C.

24. The root end (16) of a wind turbine blade comprising a plurality of bushings (311, 312) for attaching the wind turbine blade (10) to a wind turbine hub (8), each bushing being located between an inner sidewall (405) of the root end and an outer sidewall (406) of the root end (16), the plurality of bushings being mutually separated by retaining material (301,302,303), a first bushing (311) and a second bushing (312) of the plurality of bushings (311, 312) being separated by first retaining material (301), wherein the root end has been reinforced using a method in accordance with claim 18.

25. A method for reinforcing a first wind turbine blade region, the method comprising:

(i) forming, from an interior of a wind turbine blade, a first injection channel (661, 1961, 2061) into the first region, (ii) forming, from an interior of the wind turbine blade, a first pressure release channel (662, 1962, 2062) into the first region, wherein the first pressure release channel (662, 1962, 2062) is formed to be in fluid communication with the first injection channel (661, 1961, 2061) within the first region, and (iii) injecting adhesive material (671, 1971, 2071) into the first injection channel (661, 1961, 2061) at least until adhesive material enters the formed first pressure release channel 662, 1962, 2062), wherein the first wind turbine blade region comprises a root end (16) of the wind turbine blade (10), the root end (16) comprising a plurality of bushings (311, 312) for attaching the wind turbine blade (10) to a wind turbine hub (8), each of the bushings being located between an inner sidewall (405) of the root end and an outer sidewall (406) of the root end (16), the plurality of bushings being mutually separated by retaining material (301, 302, 303), a first bushing (311) and a second bushing (312) of the plurality of bushings (311, 312) being separated by first retaining material (301), wherein the first injection channel (661, 1961, 2061) is formed in the first retaining material (301) in the first region, wherein the first pressure release channel (662, 1962, 2062) is formed in the first retaining material (301), wherein the first pressure release channel (662, 1962, 2062) is formed to be in fluid communication with the first injection channel (561) between the inner sidewall (405) and the outer sidewall (406) in the first region.

26. The method in accordance with claim 25, wherein the first region is located between an inner surface (305) of the wind turbine blade and an outer surface (306) of the wind turbine blade, and wherein the first injection channel (561, 661, 1961, 2061) is formed starting from the inner surface, and wherein the first pressure release channel (562, 662, 1962, 2062) is formed starting from the inner surface.

27. The method in accordance with claim 25, further comprising a step of inserting an injection packer into the first injection channel before the step of injecting adhesive material into the first injection channel.

28. The method in accordance with claim 25, further comprising a step of attaching injecting means in fluid communication with the first injection channel.

29. The method in accordance with claim 25, wherein the adhesive material is provided at least until adhesive material entirely fills the first pressure release channel.

30. The method in accordance with claim 25, further comprising repeating step (i) one or more times to provide corresponding one or more additional injection channels for injecting adhesive material.

31. The method in accordance with claim 25, further comprising repeating step (ii) one or more times to provide corresponding one or more additional pressure release channels, the one or more additional pressure release channels being formed to be in fluid communication with the first injection channel and/or with an additional injection channel.

32. The method in accordance with claim 25, wherein the first injection channel (561) is in fluid communication with a cavity located in a shear web (50) of the blade.

33. The method in accordance with claim 25, wherein the first injection channel (561) is in fluid communication with a cavity located in a spar cap (41) of the blade.

* * * * *